United States Patent
Barton et al.

(10) Patent No.: US 9,121,609 B2
(45) Date of Patent: Sep. 1, 2015

(54) METHOD AND APPARATUS FOR INTRODUCING DILUENT FLOW INTO A COMBUSTOR

(75) Inventors: Jesse Ellis Barton, Simpsonville, SC (US); Jonathan Dwight Berry, Simpsonville, SC (US); Mark Allan Hadley, Greer, SC (US); Glenn David Nelson, Greer, SC (US); Robert Joseph Rohrssen, Simpsonville, SC (US); John Drake Vanselow, Taylors, SC (US)

(73) Assignee: General Electric Company, Schenectady, NY (US)

( * ) Notice: Subject to any disclaimer, the term of this patent is extended or adjusted under 35 U.S.C. 154(b) by 1041 days.

(21) Appl. No.: 12/250,875

(22) Filed: Oct. 14, 2008

(65) Prior Publication Data

US 2010/0092896 A1      Apr. 15, 2010

(51) Int. Cl.
*F23C 9/08* (2006.01)
*F23R 3/04* (2006.01)
(Continued)

(52) U.S. Cl.
CPC . *F23R 3/04* (2013.01); *F23L 7/005* (2013.01); *F23R 3/283* (2013.01); *F23R 3/44* (2013.01);
(Continued)

(58) Field of Classification Search
CPC ...... F23C 9/08; F23C 99/008; F23C 2203/30; F23D 11/38; Y02E 20/342; F23J 2215/10; F23J 2219/80; F23L 2900/07009; F23L 2900/07003; F23L 2900/07002; F23R 2900/00017; F23R 3/04; F23R 3/283; F23R 3/44; F23R 3/60
USPC ............... 431/2, 8, 9, 10, 180, 182, 183, 187, 431/195, 253, 344, 350, 351, 352, 353; 60/796, 775, 39.53, 39.55, 752, 756, 60/760
IPC ................. F23C 9/08; F23L 7/00; F23D 11/38, F23D 14/82; F23N 1/08
See application file for complete search history.

(56) References Cited

U.S. PATENT DOCUMENTS 1,426,815 A * 8/1922 Burgstaller .................... 431/351
1,588,792 A * 6/1926 Dodge .......................... 239/431
(Continued)

FOREIGN PATENT DOCUMENTS

DE    2356822 A1    5/1975
EP    0896193 A2    2/1999
(Continued)

OTHER PUBLICATIONS

"Merriam Webster's Collegiate Dictionary, Tenth Edition"; Merriam-Webster, Inc., Springfield, MA; 1997; p. 72.*
Office Action from JP Application No. 2009-234696 dated Jul. 30, 2013, along with unofficial English translation.
Search Report and Written Opinion from EP Application No. 09172916.0 dated Jul. 22, 2013.

*Primary Examiner* — Steven B McAllister
*Assistant Examiner* — Daniel E Namay

(57) ABSTRACT

Disclosed is a combustor including a baffle plate having at least one through baffle hole and at least one fuel nozzle extending through the at least one baffle hole. At least one shroud is secured to the baffle plate and includes at least one piston ring disposed at the shroud. The at least one piston ring is configured to meter a flow of diluent between the at least one shroud and the at least one fuel nozzle. Further disclosed is a method for providing diluent to a combustor including providing a piston ring gap defined by at least one piston ring disposed at a baffle plate and a fuel nozzle extending through a through hole in the baffle plate. The diluent is flowed through the piston ring gap toward at least one airflow hole in the fuel nozzle.

15 Claims, 6 Drawing Sheets

(51) Int. Cl.
*F23R 3/28* (2006.01)
*F23R 3/44* (2006.01)
*F23R 3/60* (2006.01)
*F23L 7/00* (2006.01)
*F23D 11/38* (2006.01)

(52) U.S. Cl.
CPC ......... *F23R 3/60* (2013.01); *F23L 2900/07002* (2013.01); *F23L 2900/07003* (2013.01); *F23L 2900/07009* (2013.01); *F23R 2900/00017* (2013.01); *Y02E 20/342* (2013.01)

(56) References Cited

U.S. PATENT DOCUMENTS

| | | | |
|---|---|---|---|
| 1,781,236 A | 11/1930 | Lilge | |
| 2,304,397 A * | 12/1942 | Campbell | 208/176 |
| 2,304,398 A * | 12/1942 | Campbell | 208/151 |
| 2,413,407 A * | 12/1946 | Dreyfus | 208/130 |
| 2,812,978 A | 11/1957 | Billman | |
| 3,087,484 A * | 4/1963 | Eddy | 126/92 B |
| 3,104,947 A * | 9/1963 | Switzer et al. | 203/12 |
| 3,187,799 A * | 6/1965 | Nesbitt | 431/9 |
| 3,195,606 A * | 7/1965 | Stout | 432/212 |
| 3,580,700 A * | 5/1971 | Hinckley | 431/344 |
| 3,620,013 A * | 11/1971 | Rogers et al. | 60/725 |
| 3,704,762 A | 12/1972 | Smith et al. | |
| 3,724,229 A | 4/1973 | Seliber | |
| 3,735,930 A | 5/1973 | Mori | |
| 3,747,336 A | 7/1973 | Dibelius et al. | |
| 3,831,854 A * | 8/1974 | Sato et al. | 239/406 |
| 3,845,620 A * | 11/1974 | Kenworthy | 60/757 |
| 3,861,858 A * | 1/1975 | Hemsath et al. | 431/353 |
| 3,869,246 A | 3/1975 | Hammond, Jr. et al. | |
| 3,890,088 A * | 6/1975 | Ferri | 431/351 |
| 4,054,028 A * | 10/1977 | Kawaguchi | 60/39.23 |
| 4,085,708 A | 4/1978 | Ashdown | |
| 4,322,945 A | 4/1982 | Peterson et al. | |
| 4,365,753 A | 12/1982 | Harding et al. | |
| 4,421,989 A | 12/1983 | Brannstrom | |
| 4,569,652 A * | 2/1986 | Nakamura et al. | 431/201 |
| 4,600,151 A | 7/1986 | Bradley | |
| 4,893,468 A | 1/1990 | Hines | |
| 4,907,962 A * | 3/1990 | Azuhata et al. | 431/174 |
| 4,928,478 A | 5/1990 | Maslak | |
| 4,948,055 A | 8/1990 | Belcher et al. | |
| 4,955,191 A | 9/1990 | Okamoto et al. | |
| 5,044,559 A * | 9/1991 | Russell et al. | 239/406 |
| 5,054,279 A | 10/1991 | Hines | |
| 5,058,374 A | 10/1991 | Bechlher et al. | |
| 5,158,445 A * | 10/1992 | Khinkis | 431/10 |
| 5,247,790 A | 9/1993 | Donlan et al. | |
| 5,271,216 A | 12/1993 | Frutschi et al. | |
| 5,271,218 A | 12/1993 | Taylor | |
| 5,284,438 A | 2/1994 | McGill et al. | |
| 5,285,632 A | 2/1994 | Halila | |
| 5,329,758 A | 7/1994 | Urbach et al. | |
| 5,331,806 A | 7/1994 | Warkentin | |
| 5,357,745 A | 10/1994 | Probert | |
| 5,361,578 A | 11/1994 | Donlan | |
| 5,365,865 A * | 11/1994 | Monro | 110/264 |
| 5,375,409 A | 12/1994 | Lamar | |
| 5,444,982 A * | 8/1995 | Heberling et al. | 60/737 |
| 5,457,721 A | 10/1995 | Tsiklauri et al. | |
| 5,526,386 A | 6/1996 | Tsiklauri et al. | |
| 5,540,056 A | 7/1996 | Heberling et al. | |
| 5,581,999 A | 12/1996 | Johnson | |
| 5,623,827 A | 4/1997 | Monty | |
| 5,634,329 A | 6/1997 | Andersson et al. | |
| 5,658,141 A * | 8/1997 | Larquet et al. | 431/187 |
| 5,669,766 A * | 9/1997 | Hufton | 431/187 |
| 5,680,823 A * | 10/1997 | LaRose | 110/262 |
| 5,697,306 A * | 12/1997 | LaRue et al. | 110/261 |
| 5,758,587 A * | 6/1998 | Buchner et al. | 110/260 |
| 5,784,875 A | 7/1998 | Statler | |
| 5,793,831 A | 8/1998 | Tsiklauri et al. | |
| 5,794,449 A | 8/1998 | Razdan et al. | |
| 5,813,232 A | 9/1998 | Razdan et al. | |
| 5,861,600 A | 1/1999 | Jensen | |
| 5,867,977 A | 2/1999 | Zachary et al. | |
| 5,873,234 A | 2/1999 | Bruckner et al. | |
| 5,894,732 A | 4/1999 | Kwan | |
| 5,930,990 A | 8/1999 | Zachary et al. | |
| 5,946,917 A | 9/1999 | Hums et al. | |
| 5,956,955 A | 9/1999 | Schmid | |
| 6,003,299 A | 12/1999 | Idleman | |
| 6,035,645 A | 3/2000 | Bensaadi et al. | |
| 6,047,539 A | 4/2000 | Farmer | |
| 6,089,024 A | 7/2000 | Hatanaka | |
| 6,094,916 A | 8/2000 | Puri et al. | |
| 6,112,676 A * | 9/2000 | Okazaki et al. | 110/261 |
| 6,189,310 B1 | 2/2001 | Kalitventzeff et al. | |
| 6,192,688 B1 | 2/2001 | Beebe | |
| 6,267,585 B1 | 7/2001 | Suttrop | |
| 6,286,300 B1 | 9/2001 | Zelina et al. | |
| 6,293,088 B1 | 9/2001 | Moore et al. | |
| 6,298,667 B1 | 10/2001 | Glynn et al. | |
| 6,334,309 B1 | 1/2002 | Dean et al. | |
| 6,360,677 B1 * | 3/2002 | Robillard et al. | 110/260 |
| 6,360,776 B1 | 3/2002 | McCormick et al. | |
| 6,370,862 B1 | 4/2002 | Cheng | |
| 6,389,800 B2 | 5/2002 | Badeer | |
| 6,393,823 B1 | 5/2002 | Badeer | |
| 6,405,521 B1 | 6/2002 | Ranasinghe et al. | |
| 6,422,022 B2 | 7/2002 | Gorman et al. | |
| 6,434,945 B1 | 8/2002 | Mandai et al. | |
| 6,497,105 B1 | 12/2002 | Stastny | |
| 6,499,303 B1 | 12/2002 | Polukort et al. | |
| 6,511,312 B2 * | 1/2003 | Primdahl | 431/187 |
| 6,526,758 B2 | 3/2003 | Ranasinghe et al. | |
| 6,530,224 B1 | 3/2003 | Conchieri | |
| 6,609,380 B2 | 8/2003 | Mick et al. | |
| 6,748,733 B2 | 6/2004 | Tamaro | |
| 6,782,703 B2 | 8/2004 | Dovali-Solis | |
| 6,928,821 B2 | 8/2005 | Gerhold | |
| 6,983,605 B1 | 1/2006 | Hook et al. | |
| 6,986,658 B2 * | 1/2006 | Stephens et al. | 431/115 |
| 7,000,396 B1 | 2/2006 | Storey | |
| 7,104,069 B2 | 9/2006 | Martling et al. | |
| 7,104,070 B2 | 9/2006 | Iasillo et al. | |
| 7,140,189 B2 | 11/2006 | Markarian et al. | |
| 7,143,583 B2 | 12/2006 | Hayashi et al. | |
| 7,185,497 B2 | 3/2007 | Dudebout et al. | |
| 7,228,682 B2 | 6/2007 | Kashler | |
| 7,357,820 B2 * | 4/2008 | Wolf et al. | 48/127.3 |
| 7,395,670 B1 | 7/2008 | Drnevich et al. | |
| 7,412,833 B2 * | 8/2008 | Widener | 60/772 |
| 7,553,153 B2 * | 6/2009 | Okazaki et al. | 431/187 |
| 7,681,398 B2 | 3/2010 | Patel et al. | |
| 7,861,528 B2 * | 1/2011 | Myers et al. | 60/737 |
| 7,901,204 B2 * | 3/2011 | Stephens et al. | 431/174 |
| 7,909,601 B2 * | 3/2011 | Stephens et al. | 431/278 |
| 7,926,281 B2 | 4/2011 | Commaret et al. | |
| 8,075,305 B2 * | 12/2011 | Stephens et al. | 431/174 |
| 8,276,388 B2 | 10/2012 | Cayre et al. | |
| 8,347,631 B2 * | 1/2013 | Bailey et al. | 60/740 |
| 8,449,292 B2 * | 5/2013 | Knoch et al. | 431/284 |
| 2002/0197574 A1 * | 12/2002 | Jones et al. | 431/8 |
| 2003/0013053 A1 * | 1/2003 | Dutescu et al. | 431/5 |
| 2003/0190570 A1 * | 10/2003 | Jones et al. | 431/8 |
| 2004/0229178 A1 | 11/2004 | Mandai et al. | 431/195 |
| 2005/0013755 A1 | 1/2005 | Higgins | 423/235 |
| 2005/0255416 A1 | 11/2005 | Haase | 431/2 |
| 2006/0029896 A1 * | 2/2006 | Poe et al. | 431/285 |
| 2006/0059915 A1 | 3/2006 | Furletov et al. | |
| 2006/0246388 A1 * | 11/2006 | Feese et al. | 431/215 |
| 2007/0003897 A1 | 1/2007 | Koizumi et al. | |
| 2007/0044477 A1 | 3/2007 | Held et al. | |
| 2007/0092847 A1 * | 4/2007 | Okazaki et al. | 431/187 |
| 2007/0113556 A1 | 5/2007 | Biebel et al. | |
| 2007/0131796 A1 * | 6/2007 | Hessler | 239/424 |
| 2007/0151255 A1 | 7/2007 | Johnson et al. | |
| 2007/0172783 A1 * | 7/2007 | Stephens et al. | 431/278 |
| 2007/0172785 A1 * | 7/2007 | Stephens et al. | 431/278 |

(56) References Cited

U.S. PATENT DOCUMENTS

| | | |
|---|---|---|
| 2007/0227147 A1 | 10/2007 | Cayre et al. |
| 2007/0234735 A1 | 10/2007 | Mosbacher et al. |
| 2007/0281265 A1* | 12/2007 | Sarv et al. .................... 431/187 |
| 2009/0013968 A1 | 1/2009 | Keegan et al. |
| 2010/0037614 A1* | 2/2010 | York ................ 60/737 |
| 2010/0055627 A1 | 3/2010 | D'Agostini ....................... 431/8 |
| 2010/0089020 A1* | 4/2010 | Barton et al. ............... 60/39.53 |
| 2010/0089021 A1* | 4/2010 | Barton et al. ............... 60/39.53 |
| 2010/0089022 A1* | 4/2010 | Barton et al. ............... 60/39.53 |
| 2010/0154789 A1* | 6/2010 | Hirota et al. ................ 126/85 R |
| 2010/0223929 A1* | 9/2010 | Bailey et al. .................... 60/737 |
| 2011/0183274 A1* | 7/2011 | Bahn ................ 431/2 |

FOREIGN PATENT DOCUMENTS

| | | |
|---|---|---|
| EP | 1286111 A2 | 2/2003 |
| EP | 1767855 A1 | 3/2007 |
| GB | 2085117 A | 4/1982 |
| JP | H09152105 A | 6/1997 |
| JP | 2008089297 A | 4/2008 |
| WO | 2008047825 A1 | 4/2008 |

* cited by examiner

METHOD AND APPARATUS FOR INTRODUCING DILUENT FLOW INTO A COMBUSTOR

BACKGROUND OF THE INVENTION

The subject invention relates generally to combustors. More particularly, the subject invention relates to delivery of diluent flow into a combustor via a fuel nozzle.

Combustors typically include one or more fuel nozzles that introduce a fuel or a mixture of fuel and air to a combustion chamber where it is ignited. In some combustors, the fuel nozzles extend through holes disposed in a baffle plate of the combustor. In these combustors, it is often advantageous to introduce a volume of diluent, often nitrogen or steam, to the combustor to reduce $NO_x$ emissions and/or augment output of the combustor. The diluent is urged from a chamber through a gap between the baffle plate and each fuel nozzle, and then flows along a periphery of the fuel nozzle where a portion of the diluent enters the fuel nozzle via holes in the air collar of the fuel nozzle. The gaps between the baffle plate and the fuel nozzles, however, vary due to assembly tolerance stack-ups between the baffle plate and the fuel nozzles. The gap variation results in variation in diluent flow around each nozzle and throughout the combustor assembly. Further, an axial distance between the gap and the air collar holes in the fuel nozzle allow diluent to reach the combustion reaction zone without passing through the fuel nozzle and mixing directly with the fuel and air. Both of these effects reduce diluent efficiency and therefore a greater volume of diluent is required to achieve an equivalent amount of diluent flow into the fuel nozzle. The excess diluent that flows toward the combustion reaction zone without passing through the fuel nozzle leads to operability problems in the combustor such as dynamics and lean blow out.

BRIEF DESCRIPTION OF THE INVENTION

According to one aspect of the invention, a combustor includes a baffle plate having at least one through baffle hole and at least one fuel nozzle extending through the at least one baffle hole. At least one shroud is secured to the baffle plate and includes at least one piston ring disposed at the at least one shroud. The at least one piston ring is configured to meter a flow of diluent between the at least one shroud and the at least one fuel nozzle.

According to another aspect of the invention, a method for providing diluent to a combustor includes providing a piston ring gap defined by at least one piston ring disposed at a baffle plate and a fuel nozzle extending through a through hole in the baffle plate. The diluent is flowed through the piston ring gap toward at least one airflow hole in the fuel nozzle.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
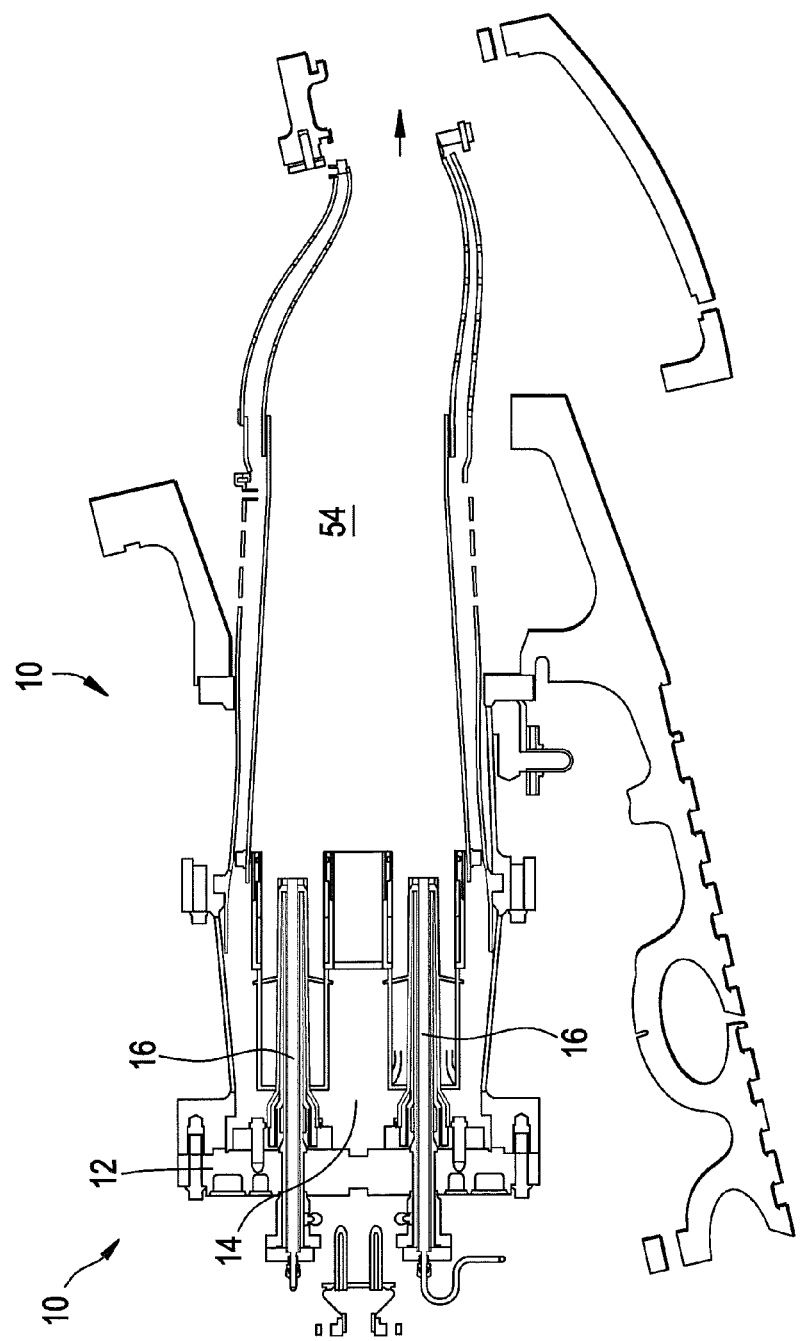
FIG. 1 is a cross-sectional view of an embodiment of a combustor.
Figure 2:
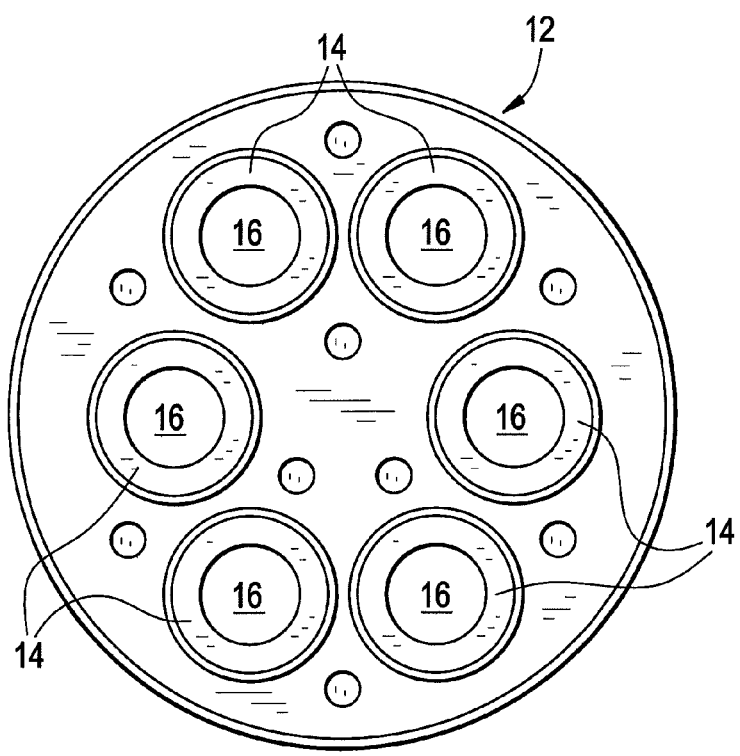
FIG. 2 is an end view of an embodiment of a baffle plate assembly of a combustor.
Figure 3:
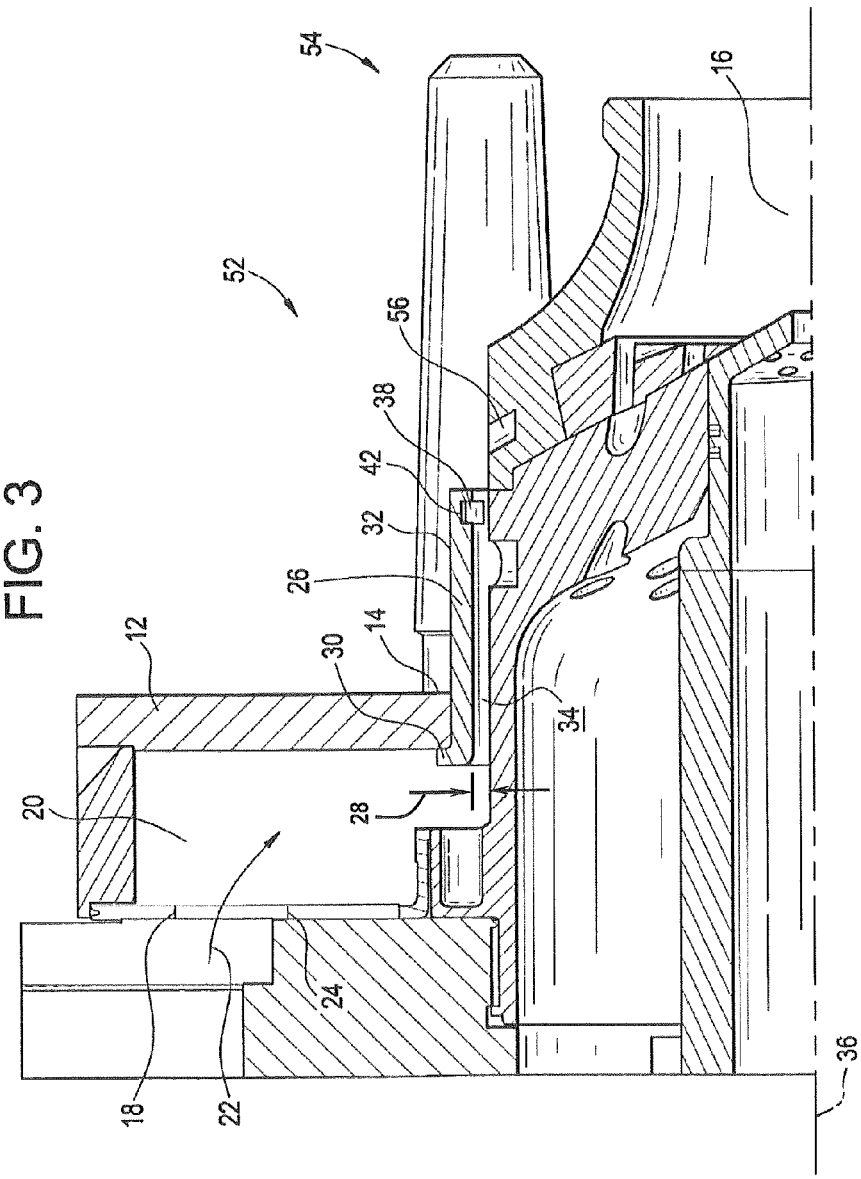
FIG. 3 is a partial cross-sectional view of a fuel nozzle of the baffle plate assembly of FIG. 2.
Figure 4:
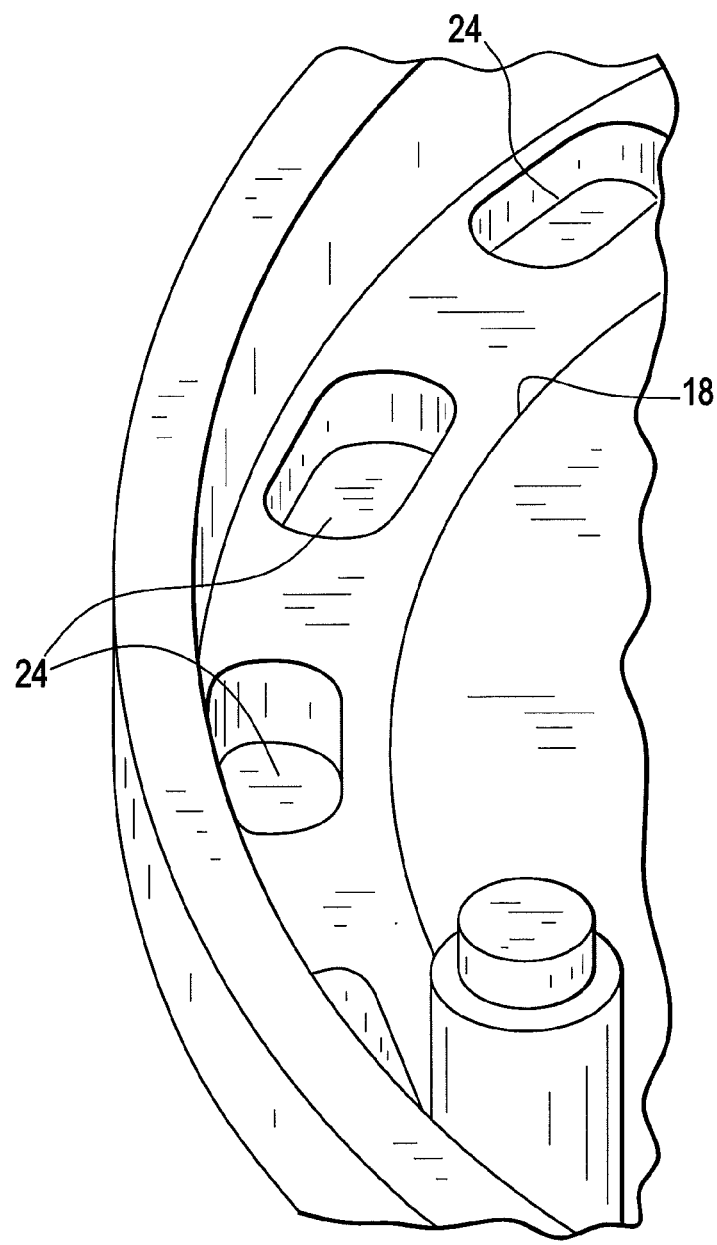
FIG. 4 is a perspective view of an embodiment of a cover ring that supplies diluent to a plenum defined by the baffle plate assembly of FIG. 2.

Shown in FIG. 1 is a combustor 10. The combustor 10 includes a baffle plate 12 having six baffle holes 14, through which six fuel nozzles 16 extend, for example, one fuel nozzle 16 extending through each baffle hole 14, as best shown in FIG. 2. While six fuel nozzles 16 are shown in FIG. 2, it is to be appreciated that other quantities of fuel nozzles 16, for example, one or four fuel nozzles 16, may be utilized. As shown in FIG. 3, the baffle plate 12 and a cover ring 18 define a plenum 20 into which a diluent flow 22 is guided via an array of orifices 24 (best shown in FIG. 4) in the cover ring 18. In some embodiments, the diluent flow 22 may comprise steam, or other diluents such as nitrogen.

Figure 5:
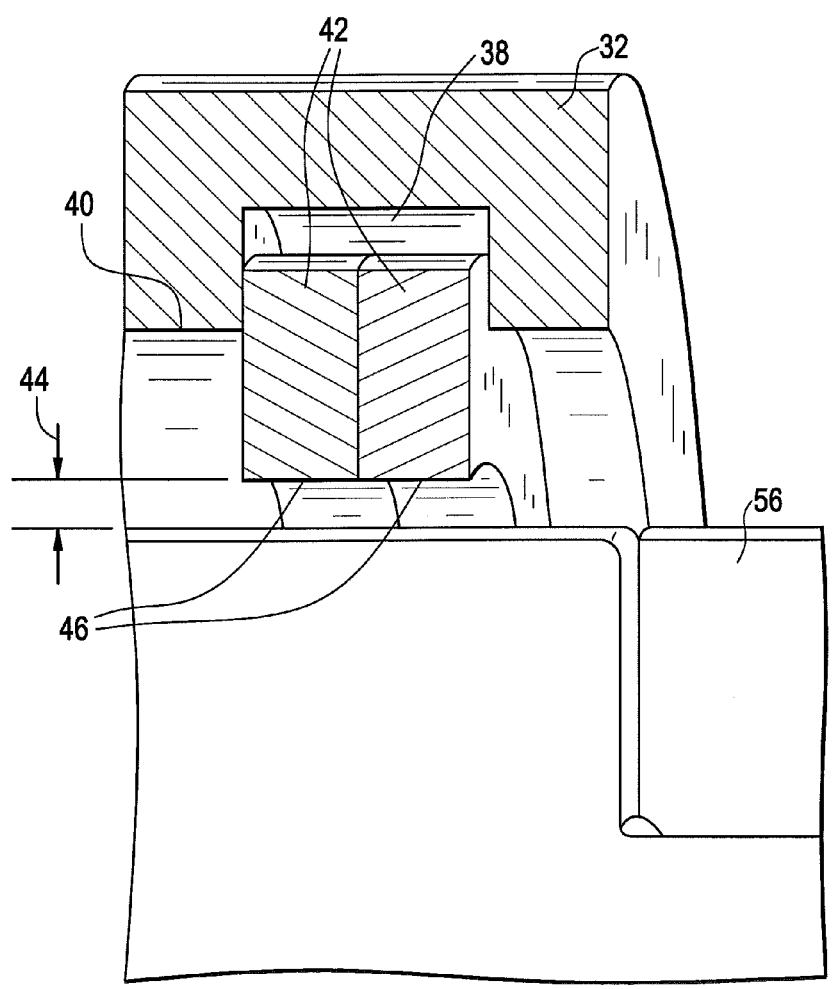
FIG. 5 is a cross-sectional view illustrating an embodiment of a piston ring arrangement of the baffle plate assembly of FIG. 2.

At each fuel nozzle 16, as shown in FIG. 3, a shroud 26 is disposed at the baffle hole 14 between the baffle plate 12 and the fuel nozzle 16. The shroud 26 is affixed to the baffle plate 12 by welding or by other means of attachment such as one or more mechanical fasteners, by brazing, or by adhesives. The shroud 26 extends circumferentially around the fuel nozzle 16 and is disposed at a radial distance from the fuel nozzle 16 leaving a shroud gap 28 between the shroud 26 and the fuel nozzle 16. In some embodiments, the shroud 26 comprises an attachment flange 30 at which the shroud 26 is affixed to the baffle plate 12, and an annular flow portion 32 which extends longitudinally along the fuel nozzle 16 defining a flow channel 34 between the flow portion 32 and the fuel nozzle 16. In some embodiments, the flow portion 32 is substantially parallel to the fuel nozzle 16 such that the flow channel 34 has a substantially constant cross-sectional area along a nozzle axis 36. As shown in FIG. 5, the shroud includes a piston ring slot 38 at an inner surface 40 of the flow portion 32, which extends circumferentially around the fuel nozzle 16. One or more piston rings 42 are disposed in the piston ring slot 38 and extend radially inwardly toward the fuel nozzle 16 defining a piston ring gap 44 between the fuel nozzle 16 and an inboard portion 46 of the one or more piston rings 42. Two piston rings 42 are shown in the embodiment of FIG. 5, but it is to be appreciated that other quantities of piston rings 42, for example one or three piston rings 42 may be utilized.

Figure 6:
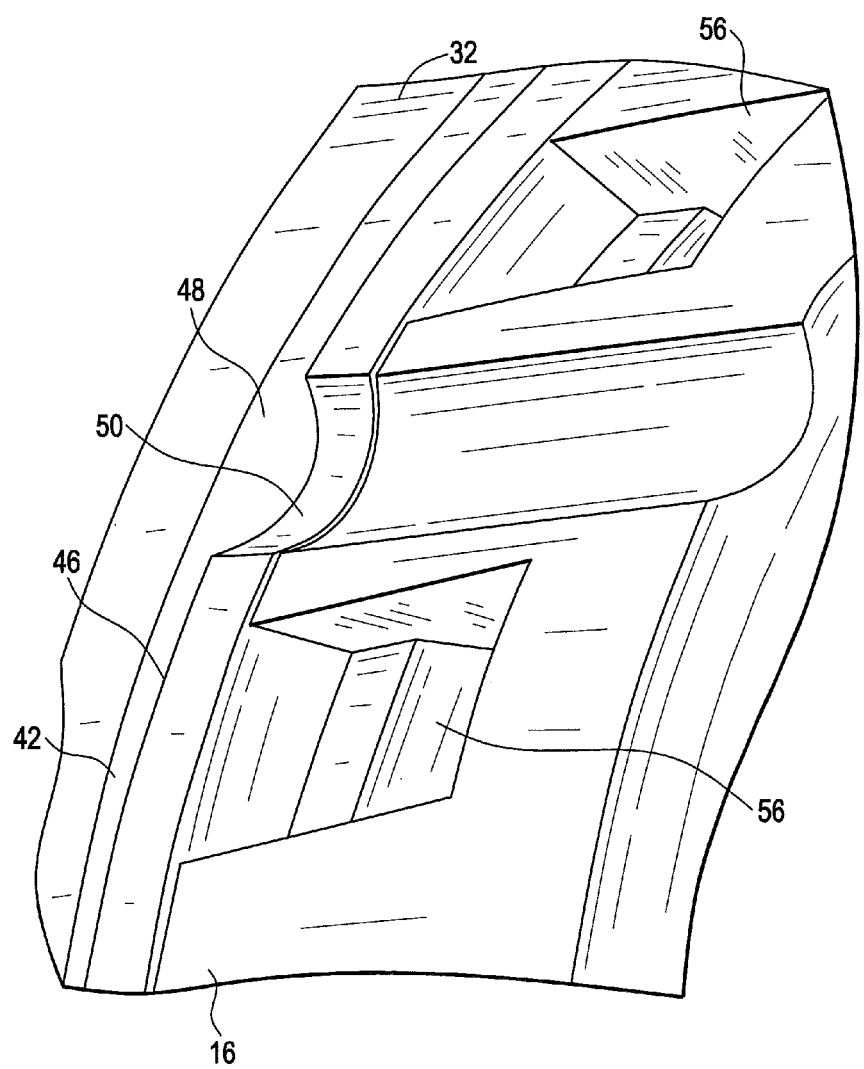
FIG. 6 is a perspective view of a locating feature of the piston ring arrangement of FIG. 5.

As shown in FIG. 6, the piston rings 42 include at least one locating tab 48 extending radially inwardly from the inboard portion 46 toward the fuel nozzle 16. Each locating tab 48 is configured to be received in a corresponding locating slot 50 in the fuel nozzle 16. When the baffle plate 12 and the installed piston rings 42 are assembled to the fuel nozzle 16, the locating tabs 48 align with the locating slots 50 and are installed thereto setting a circumferential orientation of the piston rings 42 around the fuel nozzle 16 and establishing a desired piston ring gap 44, which is interrupted at each locating tab 48 location. Utilizing the piston rings 42 located by the combination of the locating tabs 48 and locating slots 50 establishes a consistent piston ring gap 44 around each fuel nozzle 16.

In operation, the diluent flow 22 is guided from the plenum 20, along the shroud gap 28, and through the piston ring gap 44. Once through the piston ring gap 44, the diluent flow 22 is introduced to an exterior 52 of the baffle plate 12 at a head end 54 of the combustor 10, in close proximity to a plurality of air flow holes 56 in the fuel nozzle 16. At least a portion of the diluent flow 22 enters the plurality of air flow holes 56 and is mixed with air and fuel in the nozzle 16. Guiding the diluent flow 22 along the shroud gap 28 allows injection of the diluent flow 22 nearby the air flow holes 56 to increase efficiency of the diluent flow 22. Further, the diluent flow 22 is metered via the piston ring gap 44 and is consistent around the baffle plate 12 due to the use of the locating tabs 48 to establish consistent piston ring gaps 44. Thus, a volume of diluent flow 22 required is reduced thereby reducing operability issues such as dynamics and lean blow out.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combustor comprising:
   a baffle plate including at least one through baffle hole;
   a cover ring disposed upstream of the baffle plate and defining a diluent plenum therewith, the cover ring including one or more orifices to guide a flow of diluent into the diluent plenum;
   at least one fuel nozzle extending through the at least one through baffle hole;
   at least one shroud secured to the baffle plate, the at least one shroud and the at least one fuel nozzle defining a flow channel therebetween extending from the diluent plenum through the baffle plate, the at least one shroud including at least one piston ring disposed at the at least one shroud, the at least one piston ring configured to control the flow of diluent from the diluent plenum and through the flow channel between the at least one shroud and the at least one fuel nozzle; and
   a plurality of air flow holes disposed in the at least one fuel nozzle, at least a portion of the flow of diluent flowing through a piston ring gap between the at least one fuel nozzle and the at least one piston ring and into the plurality of air flow holes for mixing with a flow of air and a flow of fuel in the at least one fuel nozzle.

2. The combustor of claim 1 wherein the at least one piston ring includes at least one locating feature positionable at a corresponding locating slot in the at least one fuel nozzle.

3. The combustor of claim 2 wherein the at least one locating feature sets a piston ring gap between the at least one piston ring and the at least one fuel nozzle.

4. The combustor of claim 2 wherein the at least one locating feature is at least one locating tab.

5. The combustor of claim 2 wherein the at least one locating feature is four locating features.

6. The combustor of claim 1 wherein the at least one piston ring is two piston rings.

7. The combustor of claim 1 wherein the at least one piston ring is disposed at an end of a downstream end of the flow channel.

8. The combustor of claim 1 wherein the at least one piston ring is disposed in at least one piston ring slot in the at least one shroud.

9. The combustor of claim 1 wherein the diluent is at least one of steam and/or nitrogen.

10. A method for providing diluent to a combustor comprising:
    providing a piston ring gap defined by at least one piston ring disposed at a baffle plate and a fuel nozzle extending through a through hole in the baffle plate;
    guiding a diluent into a diluent plenum defined by the baffle plate and a cover ring disposed upstream of the baffle plate through one or more orifices in the cover ring;
    flowing the diluent from the diluent plenum through the baffle plate via a flow channel defined by a shroud and the fuel nozzle;
    flowing the diluent through the piston ring gap towards at least one airflow hole in the fuel nozzle; and
    flowing at least a portion of the diluent into the plurality of air flow holes for mixing with a flow of air and a flow of fuel in the fuel nozzle.

11. The method of claim 10 wherein the at least one piston ring is disposed in at least one piston ring slot in the shroud.

12. The method of claim 10 wherein the diluent is at least one of steam and/or nitrogen.

13. The method of claim 10 wherein the at least one piston ring includes at least one locating feature positionable at a corresponding locating slot in the fuel nozzle.

14. The method of claim 13 wherein the at least one locating feature sets a piston ring gap between the at least one piston ring and the fuel nozzle.

15. The method of claim 10 wherein the at least one piston ring is two piston rings.

\* \* \* \* \*